(12) United States Patent
Ranganath et al.

(10) Patent No.: US 8,711,202 B2
(45) Date of Patent: Apr. 29, 2014

(54) PERFORMING FAILOVER FOR A PLURALITY OF DIFFERENT TYPES OF VIDEOCONFERENCING DEVICES

(75) Inventors: Prithvi Ranganath, Bangalore (IN); Raghuram Belur, Bangalore (IN); Sandeep Lakshmipathy, Bangalore (IN); Kalluru Vijayananda Reddy, Bangalore (IN)

(73) Assignee: LifeSize Communications, Inc., Austin, TX (US)

( * ) Notice: Subject to any disclaimer, the term of this patent is extended or adjusted under 35 U.S.C. 154(b) by 343 days.

(21) Appl. No.: 13/191,189

(22) Filed: Jul. 26, 2011

(65) Prior Publication Data

US 2013/0027509 A1    Jan. 31, 2013

(51) Int. Cl.
*H04N 7/15* (2006.01)

(52) U.S. Cl.
CPC ...................................... *H04N 7/15* (2013.01)
USPC .................. 348/14.08; 348/14.09; 348/14.12; 709/294; 709/221; 709/223; 709/224; 709/226; 715/753; 370/260

(58) Field of Classification Search
USPC .................... 348/14.01–14.16; 370/260–261; 709/204, 223, 221, 224, 226; 715/743
See application file for complete search history.

(56) References Cited

U.S. PATENT DOCUMENTS

| 2003/0202112 | A1* | 10/2003 | Bowman et al. ............... 348/261 |
| 2007/0285503 | A1* | 12/2007 | Asthana et al. ............ 348/14.08 |
| 2008/0069011 | A1 | 3/2008 | Sekaran et al. |
| 2008/0077665 | A1 | 3/2008 | Sekaran et al. |
| 2008/0077666 | A1* | 3/2008 | Sekaran et al. ............... 709/204 |
| 2008/0091779 | A1 | 4/2008 | Chetuparambil et al. |
| 2010/0085417 | A1* | 4/2010 | Satyanarayanan et al. .......................... 348/14.08 |
| 2011/0066924 | A1* | 3/2011 | Dorso et al. .................. 714/776 |

OTHER PUBLICATIONS

Tandberg Content Server: Creating and managing a TCS cluster 4.1—Deployment Guide, TANDBERG—D1446003, May 2010, 53 pages.
Polycom® Distributed Media Application™ (DMA™) 7000, conferencing platform—Products—Polycom, http://www.polycom.com/products/telepresence_video/management_applications/dma_7000.html, 2 pages. (Retrieved Aug. 12, 2011).

* cited by examiner

*Primary Examiner* — Melur Ramakrishnaiah
(74) *Attorney, Agent, or Firm* — Meyertons Hood Kivlin Kowert & Goetzel, P.C.; Jeffrey C. Hood; Joel L. Stevens

(57) ABSTRACT

Providing high availability in videoconferences system. A first plurality of videoconferencing devices of a first type may be monitored. Additionally, a second plurality of videoconferencing devices of a second type may be monitored. During this monitoring, at least one device of the first plurality of videoconferencing devices performs activities corresponding to a respective videoconference and at least one device of the second plurality of videoconferencing devices performs activities corresponding to the respective videoconference. In response to failure of a one of the devices associated with the respective videoconference, failover to a second device of the same type may be performed. After performing failover, the second device performs the activities corresponding to the respective videoconference that the original device was performing.

18 Claims, 11 Drawing Sheets

PERFORMING FAILOVER FOR A PLURALITY OF DIFFERENT TYPES OF VIDEOCONFERENCING DEVICES

FIELD OF THE INVENTION

The present invention relates generally to conferencing and, more specifically, to a method for performing failover for a plurality of different types of videoconferencing devices.

DESCRIPTION OF THE RELATED ART

Videoconferencing may be used to allow two or more participants at remote locations to communicate using both video and audio. Each participant location may include a videoconferencing system for video/audio communication with other participants. Each videoconferencing system may include a camera and microphone to collect video and audio from a first or local participant to send to one or more other (remote) participants. Each videoconferencing system may also include a display and speaker to reproduce video and audio received from remote participant(s).

As videoconferencing is used more and more to perform communication, it is important to monitor and distribute videoconferencing workloads. Accordingly, improvements in videoconferencing are desired.

SUMMARY OF THE INVENTION

Various embodiments are presented of a system and method for providing high availability in videoconferencing systems.

Initially, videoconferencing devices may be monitored, e.g., by computer system(s), such as a server. In some embodiments, the computer system performing the monitoring may be associated with a videoconferencing service or a server associated with an entity that includes a multitude of videoconferencing devices for performing videoconferencing. Additionally, the computer system may be dedicated to monitoring the videoconferencing devices and maintaining state data associated with the videoconferencing devices, e.g., for failover and/or load balancing. Monitoring may be performed via a number of different mechanisms. For example, the computer system(s) may periodically send signals that require a response (e.g., "ping") from the corresponding videoconferencing device, e.g., every 1 second, 30 seconds, 1 minute, etc. Alternatively, or additionally, the devices being monitored may send "heartbeat" signals to the computer system(s) performing the monitoring, e.g., at similar rates to the signal described above. Accordingly, in one embodiment, the method may determine whether the videoconferencing devices are still active based on whether a response or heartbeat signal is received during an expected time window of time (e.g., a response is sent within 50 ms, 100 ms, 500 ms, 1 second, 5 seconds, etc. or the heartbeat signal is received at or near the scheduled time).

The monitored videoconferencing devices may be any of various types of devices. For example, the videoconferencing devices may include MCUs or bridges, gateways, recording servers, gatekeepers, firewall and/or NAT traversal servers, registrar servers, edge servers, etc. In general, a "videoconferencing device" includes any infrastructure device that is used to perform videoconferencing communication in a videoconference. In addition to different types, the videoconferencing devices may be homogenous or heterogeneous. Homogenous videoconferencing devices refer to videoconferencing devices (of the same type) provided by the same manufacturer whereas heterogeneous videoconferencing devices refer to videoconferencing devices (of the same type) provided by different manufacturers.

Accordingly, monitoring the videoconferencing devices may include monitoring a first plurality of videoconferencing devices of a first type and a second plurality of videoconferencing devices of a second type. The first and/or second videoconferencing devices may be homogenous or heterogeneous, as desired. During monitoring, various ones of the videoconferencing devices may be used for videoconferences. For example, a first device of the first type and a second device of the second type may be used in a videoconference. Additionally, one or more of these devices may stop functioning or fail (e.g., "go down"), e.g., during the videoconference. As discussed above, the method may detect this occurrence in a variety of manners, such as by a lack of response or lack of heartbeat signal. In the following, it is assumed that the first device has failed, although the descriptions below apply to any of the devices being monitored.

In response to failure of the first device, the method may perform failover of the first device to another device of the same type. For example, if the first device is an MCU, then the method may cause the videoconference to begin using a second MCU instead of the first device based on the failure of the first device. The failover may be performed in a variety of ways. For example, the monitoring server (or another computer system, as desired), may provide signals to various ones of the videoconferencing devices associated with the videoconference to change to using the new device. More specifically, following the example where the first device is an MCU, the monitoring server may provide signals to the various videoconferencing endpoints to change their affinities from the first device to the new MCU. In addition, any state information associated with the first device may be provided to the new device. For example, configuration information of the videoconference (such as connection information, bit rate, resolution, network path, etc.) may be provided to the new MCU, e.g., so that the videoconference can be continued seamlessly. Similar descriptions as the above apply to failure and failover of the second device of the second type.

In addition to performing failover, the method may also perform load balancing. For example, the monitoring server or other computer system(s) may be used to balance the load among the various videoconferencing devices. In one embodiment, the method may receive a request to perform a videoconference and determine appropriate videoconferencing devices to perform the videoconference based on current loads and/or rules systems. Accordingly, the determined videoconferencing devices may be assigned to the videoconference.

BRIEF DESCRIPTION OF THE DRAWINGS

A better understanding of the present invention may be obtained when the following detailed description is considered in conjunction with the following drawings, in which.

Figure 1:
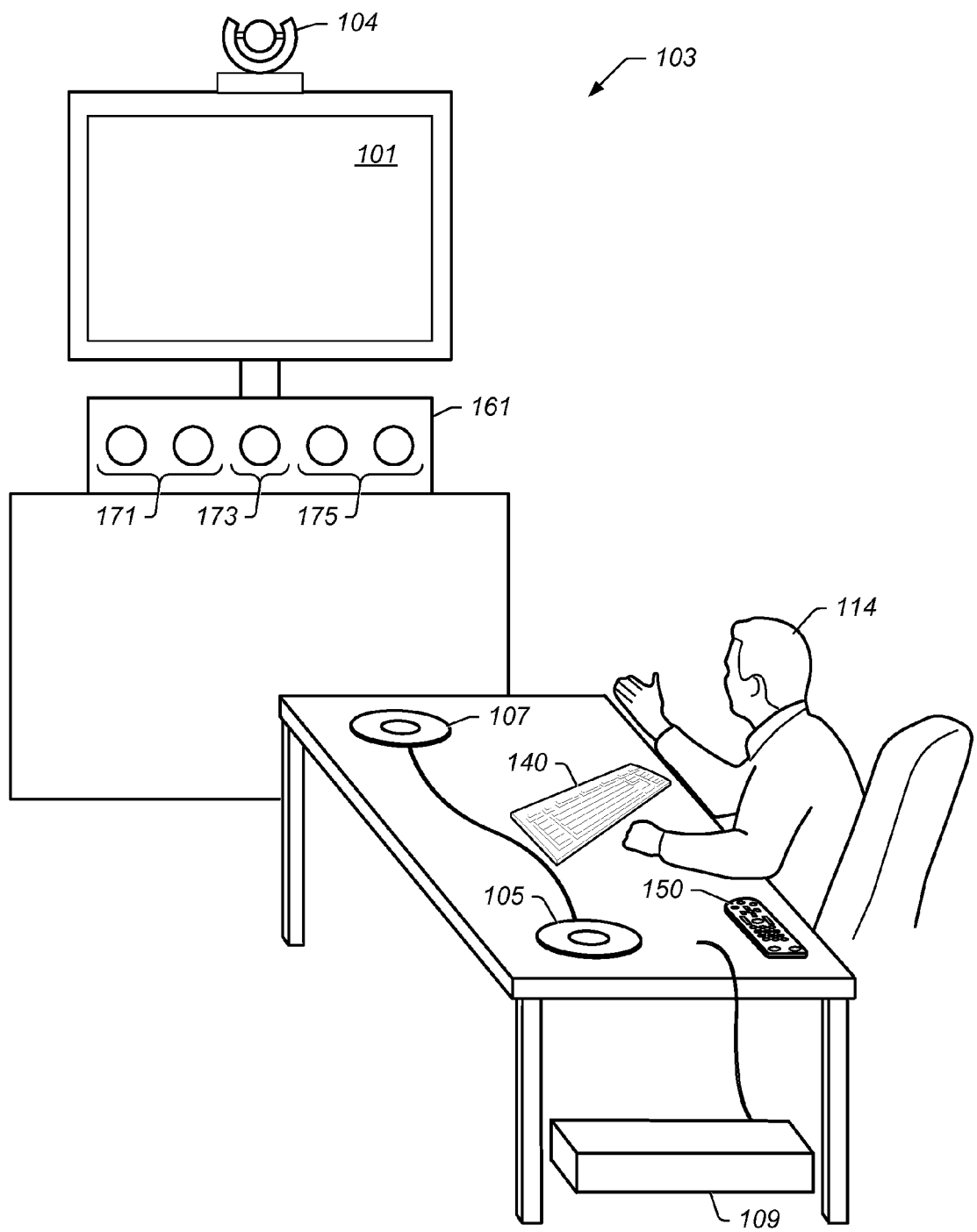
FIGS. 1 and 2 illustrate exemplary videoconferencing system participant locations, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. patent application titled "Virtual Decoders", Ser. No. 12/142,263, which was filed Jun. 19, 2008, whose inventors are Keith C. King and Wayne E. Mock, is hereby incorporated by reference in its entirety as though fully and completely set forth herein.

U.S. patent application titled "Video Conferencing System which Allows Endpoints to Perform Continuous Presence Layout Selection", Ser. No. 12/142,302, whose inventors are Keith C. King and Wayne E. Mock, is hereby incorporated by reference in its entirety as though fully and completely set forth herein.

U.S. patent application titled "Video Conferencing Device which Performs Multi-way Conferencing", Ser. No. 12/142,340, whose inventors are Keith C. King and Wayne E. Mock, is hereby incorporated by reference in its entirety as though fully and completely set forth herein.

U.S. patent application titled "Video Decoder which Processes Multiple Video Streams", Ser. No. 12/142,377, whose inventors are Keith C. King and Wayne E. Mock, is hereby incorporated by reference in its entirety as though fully and completely set forth herein.

U.S. patent application titled "Virtual Multiway Scaler Compensation", Ser. No. 12/171,358, whose inventors are Keith C. King and Wayne E. Mock, is hereby incorporated by reference in its entirety as though fully and completely set forth herein.

U.S. patent application titled "Virtual Distributed Multipoint Control Unit", Ser. No. 12/712,947, whose inventors are Keith C. King, Ashish Goyal, and Hrishikesh Gopal Kulkarni, is hereby incorporated by reference in its entirety as though fully and completely set forth herein.

U.S. patent application Ser. No. 13/093,948, titled "Recording a Videoconference Based on Recording Configurations", filed Apr. 26, 2011, whose inventors were Ashish Goyal and Binu Kaiparambil Shanmukhadas, is hereby incorporated by reference in its entirety as though fully and completely set forth herein

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:

FIGS. 1 and 2—Exemplary Participant Locations

FIG. 1 illustrates an exemplary embodiment of a videoconferencing participant location, also referred to as a videoconferencing endpoint or videoconferencing system (or videoconferencing unit). The videoconferencing system 103 may have a system codec 109 to manage both a speakerphone 105/107 and videoconferencing hardware, e.g., camera 104, display 101, speakers 171, 173, 175, etc. The speakerphones 105/107 and other videoconferencing system components may be coupled to the codec 109 and may receive audio and/or video signals from the system codec 109.

In some embodiments, the participant location may include camera 104 (e.g., an HD camera) for acquiring images (e.g., of participant 114) of the participant location. Other cameras are also contemplated. The participant location may also include display 101 (e.g., an HDTV display). Images acquired by the camera 104 may be displayed locally on the display 101 and/or may be encoded and transmitted to other participant locations in the videoconference. In some embodiments, images acquired by the camera 104 may be encoded and transmitted to a multipoint control unit (MCU), which then provides the encoded stream to other participant locations (or videoconferencing endpoints)

The participant location may further include one or more input devices, such as the computer keyboard 140. In some embodiments, the one or more input devices may be used for the videoconferencing system 103 and/or may be used for one or more other computer systems at the participant location, as desired.

The participant location may also include a sound system 161. The sound system 161 may include multiple speakers including left speakers 171, center speaker 173, and right speakers 175. Other numbers of speakers and other speaker configurations may also be used. The videoconferencing system 103 may also use one or more speakerphones 105/107 which may be daisy chained together.

In some embodiments, the videoconferencing system components (e.g., the camera 104, display 101, sound system 161, and speakerphones 105/107) may be coupled to a system codec 109. The system codec 109 may be placed on a desk or on the floor. Other placements are also contemplated. The system codec 109 may receive audio and/or video data from a network, such as a LAN (local area network) or the Internet. The system codec 109 may send the audio to the speakerphone 105/107 and/or sound system 161 and the video to the display 101. The received video may be HD video that is displayed on the HD display. The system codec 109 may also receive video data from the camera 104 and audio data from the speakerphones 105/107 and transmit the video and/or audio data over the network to another conferencing system, or to an MCU for provision to other conferencing systems. The conferencing system may be controlled by a participant or user through the user input components (e.g., buttons) on the speakerphones 105/107 and/or input devices such as the keyboard 140 and/or the remote control 150. Other system interfaces may also be used.

In various embodiments, the codec 109 may implement a real time transmission protocol. In some embodiments, the codec 109 (which may be short for "compressor/decompressor" or "coder/decoder") may comprise any system and/or method for encoding and/or decoding (e.g., compressing and decompressing) data (e.g., audio and/or video data). For example, communication applications may use codecs for encoding video and audio for transmission across networks, including compression and packetization. Codecs may also be used to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may utilize MPEG, Indeo™, and Cinepak™, among others.

In some embodiments, the videoconferencing system 103 may be designed to operate with normal display or high definition (HD) display capabilities. The videoconferencing system 103 may operate with network infrastructures that support T1 capabilities or less, e.g., 1.5 mega-bits per second or less in one embodiment, and 2 mega-bits per second in other embodiments.

Note that the videoconferencing system(s) described herein may be dedicated videoconferencing systems (i.e., whose purpose is to provide videoconferencing) or general purpose computers (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and is not used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 1) or simple (e.g., a user computer system 200 with a video camera, input devices, microphone and/or speakers such as the videoconferencing system of FIG. 2). Thus, references to videoconferencing systems, endpoints, etc. herein may refer to general computer systems which execute videoconferencing applications or dedicated videoconferencing systems. Note further that references to the videoconferencing systems performing actions may refer to the videoconferencing application(s) executed by the videoconferencing systems performing the actions (i.e., being executed to perform the actions).

The videoconferencing system 103 may execute various videoconferencing application software that presents a graphical user interface (GUI) on the display 101. The GUI may be used to present an address book, contact list, list of previous callees (call list) and/or other information indicating other videoconferencing systems that the user may desire to call to conduct a videoconference.

Note that the videoconferencing system shown in FIGS. 1 and 2 may be modified to be an audioconferencing system. For example, the audioconference could be performed over a network, e.g., the Internet, using VOIP. The audioconferencing system, for example, may simply include speakerphones 105/107, although additional components may also be present. Additionally, note that any reference to a "conferencing system" or "conferencing systems" may refer to videoconferencing systems or audioconferencing systems (e.g., teleconferencing systems). In the embodiments described below, the conference is described as a videoconference, but note that the methods may be modified for utilization in an audioconference.

Figure 3A:
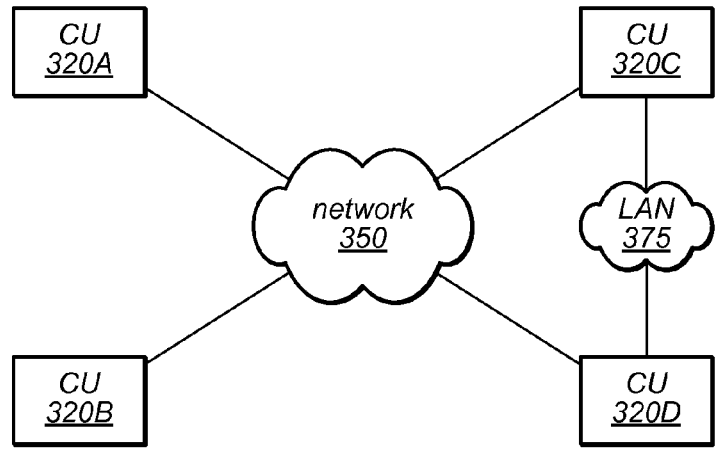
FIGS. 3A and 3B illustrate exemplary conferencing systems coupled in different configurations, according to some embodiments.
Figure 3B:
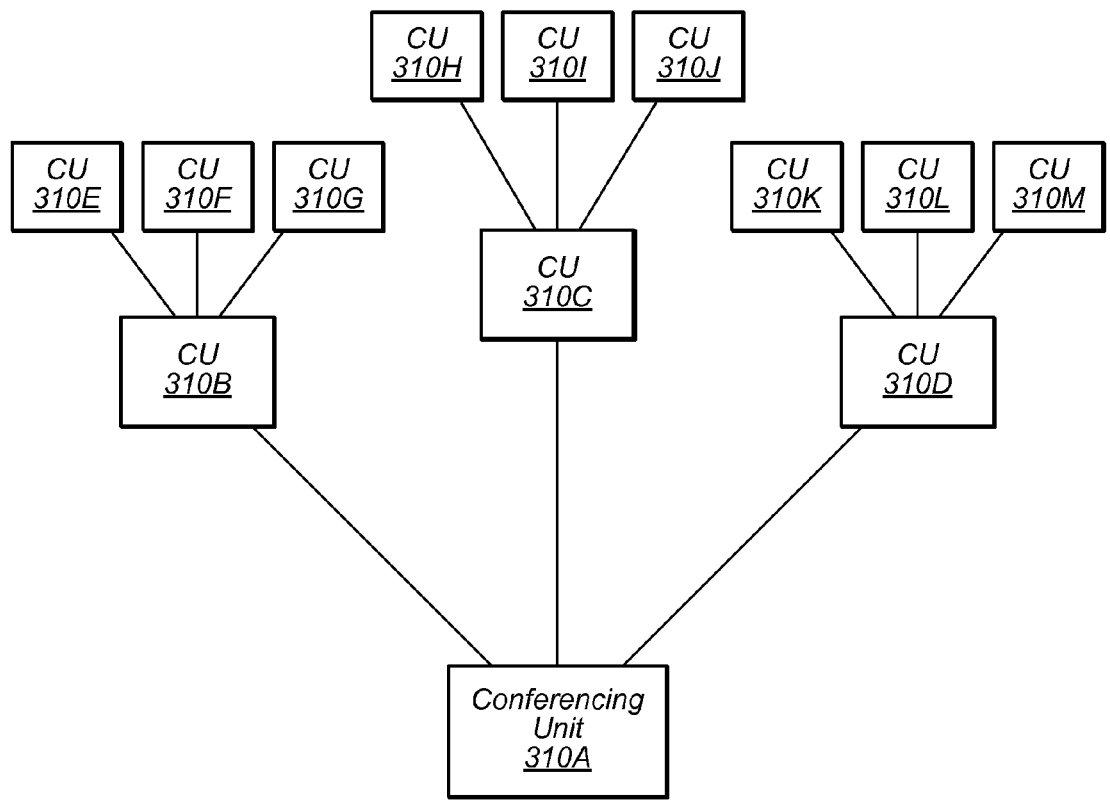

FIGS. 3A and 3B—Coupled Conferencing Systems

FIGS. 3A and 3B illustrate different configurations of conferencing systems. The conferencing systems may be operable to perform the methods described herein. As shown in FIG. 3A, conferencing systems (CUs) 320A-D (e.g., videoconferencing systems 103 described above) may be connected via network 350 (e.g., a wide area network such as the Internet) and CU 320C and 320D may be coupled over a local area network (LAN) 375. The networks may be any type of network (e.g., wired or wireless) as desired.

FIG. 3B illustrates a relationship view of conferencing systems 310A-310M. As shown, conferencing system 310A may be aware of CU 310B-310D, each of which may be aware of further CU's (310E-310G, 310H-310J, and 310K-310M respectively). CU 310A may be operable to perform the methods described herein. In a similar manner, each of the other CUs shown in FIG. 3B, such as CU 310H, may be able to perform the methods described herein, as described in more detail below. Similar remarks apply to CUs 320A-D in FIG. 3A.

Figure 4:
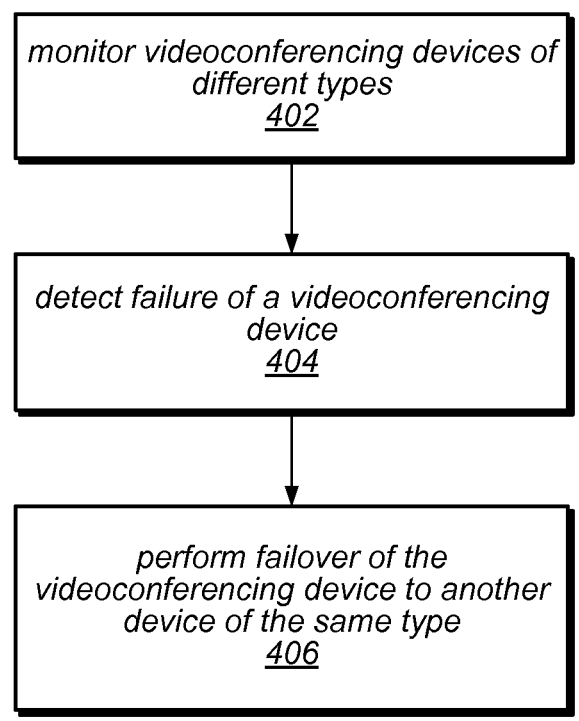
FIG. 4 is a flowchart diagram illustrating an embodiment of a method for performing failover for a plurality of different types of videoconferencing devices.

FIG. 4—Providing High Availability in Videoconferencing Systems

FIG. 4 illustrates a method for providing high availability in videoconferencing systems. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

Initially, in 402, videoconferencing devices may be monitored, e.g., by computer system(s), such as a server. For example, the videoconferencing devices may be monitored by a "monitoring server" or a "control server". In some embodiments, the monitoring may be performed by a plurality of servers (e.g., via the "cloud"). The computer system(s) performing the monitoring may be associated with a videoconferencing service or a server associated with an entity that includes a multitude of videoconferencing devices for performing videoconferencing. Additionally, the computer system may be dedicated to monitoring the videoconferencing devices and maintaining state data associated with the videoconferencing devices, e.g., for failover and/or load balancing, as discussed below.

Monitoring may be performed via a number of different mechanisms. For example, the computer system(s) may periodically send signals that require a response (e.g., "ping") from the corresponding videoconferencing device, e.g., every 100 ms, 500 ms, 1 second, 30 seconds, 1 minute, etc. Alternatively, or additionally, the devices being monitored may send "heartbeat" signals to the computer system(s) performing the monitoring, e.g., at similar rates to the signal described above. Accordingly, in one embodiment, the method may determine whether the videoconferencing devices are still active based on whether a response or heartbeat signal is received during an expected time window (e.g., a response is sent within 50 ms, 100 ms, 500 ms, 1 second, 5 seconds, etc. or the heartbeat signal is received at or near the scheduled time, within similar thresholds).

The monitored videoconferencing devices may be any of various types of devices. For example, the videoconferencing devices may include MCUs or bridges, gateways, recording servers, gatekeepers, firewall and/or NAT traversal servers, registrar servers, edge servers, etc. In general, a "videoconferencing device" includes any infrastructure device that is used to perform videoconferencing communication in a videoconference, such as those described above. However, it should be noted that the method may not monitor individual components at a videoconferencing endpoint, such as displays, cameras, etc.

In one embodiment, some of the videoconferencing devices may perform multiple functions. For example, an MCU may be implemented by a dedicated MCU device or may be performed by another type of device, such as an endpoint. Thus, for MCU type devices, the MCU functionality may be performed in hardware or software, as desired. In some embodiments, such a distinction may be considered a "subtype". For example, in the category of MCU devices, there may be hardware MCU devices and software MCU devices. In addition to different types, the videoconferencing devices may be homogenous or heterogeneous. Homogenous videoconferencing devices refer to videoconferencing devices (of the same type) provided by the same manufacturer whereas heterogeneous videoconferencing devices refer to videoconferencing devices (of the same type) provided by different manufacturers. In systems with heterogeneous devices, the various different devices from each manufacturer may be considered subtypes from within the respective type. For example, for the type MCUs, there may be a subtype for LifeSize MCUs, Cisco, Tandberg MCUs, etc. Thus, subtyping may apply to both manufacturers and hardware or software implementation distinctions.

Accordingly, monitoring the videoconferencing devices may include monitoring a first plurality of videoconferencing devices of a first type and a second plurality of videoconferencing devices of a second type, although more than two types may be monitored simultaneously. The first and/or second videoconferencing devices may be homogenous or heterogeneous (e.g., and/or include subtypes), as desired. During monitoring, various ones of the videoconferencing devices may be used for videoconferences. For example, a first device of the first type and a second device of the second type may be used in a videoconference.

The videoconference may be performed between a plurality of participants at respective participant locations. More specifically, the conference may be performed between a first participant using a first endpoint (e.g., at a first participant location) and a plurality of other participants using other endpoints (e.g., at other participant locations). Thus, endpoints may be similar to those described above regarding FIGS. 1-3B, although other variations are envisioned. The videoconference may be established according to any of a variety of methods, e.g., the one described in patent application Ser. No. 11/252,238, which was incorporated by reference above. The videoconference may utilize an instant messaging service or videoconferencing service over the Internet, as desired. In some embodiments, a multipoint control unit (MCU) may perform the first videoconference between the plurality of videoconference endpoints. For example, one of the endpoints (e.g., the first endpoint) may act as the MCU and may perform decoding and encoding operations on video information transmitted in the first videoconference between the plurality of videoconference endpoints.

Additionally, during monitoring, one or more of these videoconferencing devices may stop functioning or fail (e.g., "go down"), e.g., during the videoconference. Accordingly, in 404, the method may detect failure of one or more of the videoconferencing devices. As discussed above, the method may detect this occurrence in a variety of manners, such as by a lack of response or lack of heartbeat signal within an expected window of time. In the following, it is assumed that the first device has failed, although the descriptions below apply to any of the devices being monitored.

In 406, in response to failure of the first device, the method may perform failover of the first device to another device of the same type. For example, if the first device is an MCU, then the method may cause the videoconference to begin using a second MCU instead of the first device based on the failure of the first device. Similarly, if the first device is a recording server, the method may transfer recording from the first device to another recording server. Accordingly, the new recording server may perform recording of the videoconference instead of the failed recording server.

The failover may be performed in a variety of ways. For example, the monitoring server (or another computer system, as desired), may provide signals to various ones of the videoconferencing devices associated with the videoconference to change to using the new device. More specifically, following the example where the first device is an MCU, the monitoring server may provide signals to the various videoconferencing endpoints to change their affinities from the first device to the new MCU. Additionally, or alternatively, the MCU may be notified of the connected videoconferencing devices in the videoconference (such as the endpoints discussed above, recording servers, gateways, traversal servers, etc.). In addition, any state information associated with the first device may be provided to the new device. For example, configuration information of the videoconference (such as connection information, bit rate, resolution, network path, etc.) may be provided to the new MCU, e.g., so that the videoconference can be continued seamlessly.

Following the example of the recording server, the new recording server may be used instead of the failed recording server. The monitoring server may provide the recording server with connection information, recording configuration information (e.g., which audio-video streams to record, what bit rate, where to publish the recording, access privileges, etc.), the previous portion of the recording that was already recorded before failover, etc. In one embodiment, if the first device was recording the content onto a network storage disk, then the method may indicate to the new recording server to append the video recorded to the same file or will stitch the two at the end of recording of the second portion. Similar to above, the monitoring server may change the affinity of one or more videoconferencing endpoints (or other devices) providing the audio-video stream(s) to the failed recording server to the new recording server. Thus, in performing failover, the necessary information on any given videoconferencing device may be duplicated in order to perform failover. For example, whatever information is required by another device to perform the functionality may be duplicated in order to transfer that information to the other device during failover. This necessary information may vary from device type to device type. In cases where strict recording rules are set, such as in banks where all calls need to be recorded, the method may notify the participants through the endpoints that no failover is available and the call may be terminated in the case of unavailable recording servers where the videoconference can no longer be recorded.

In addition to transferring any configuration information, the method may also adjust for devices of different subtypes and/or from different manufacturers. For example, if the videoconferencing device is an MCU provided by LifeSize and the new MCU is provided from a different vendor, such as Tandberg, the method may automatically configure the videoconference to adjust for any discrepancies in the manner in which the videoconference is performed for the new MCU. As a specific example, the LifeSize MCU may use a particular protocol for performing communication that is different from the Tandberg MCU. Accordingly, the method may automatically configure the Tandberg MCU and/or other videoconferencing devices to adjust for the new protocol. Any other differences in configurations or methods for performing the videoconference may be adjusted for. Similar embodiments apply to switching from dedicated MCU devices to software implemented MCU devices (e.g., implemented via software on an endpoint), other types of devices from different venues, etc.

In performing failover, the new device may be selected according to a variety of manners. For example, the new device may be selected based on current load of the available devices that are of the same type as the failed device. Accordingly, in a simple embodiment, the available device having the lowest load (or having a load under a threshold) may be selected for the failover. Alternatively, or additionally, any available device with enough capacity for performing the required actions (e.g., based on the requirements of the videoconference) may be selected. In one embodiment, each videoconferencing device may have an assigned minimum, average, and/or peak load associated with the videoconferencing device. For example, the minimum may refer to the minimum occupancy that can be maintained at all points in time; average may refer to the average occupancy over time that should be maintained; and maximum may refer to the peak occupancy of the networking device—above which an administrator may be contacted. For example, a first MCU may have a 20-40-70 consumption value and a second MCU may have a 30-50-80 consumption value. Accordingly, the method may compare the current load to the minimum, average, and/or peak load of the videoconferencing device to determine whether to assign the device as the new device during failover. For example, the monitoring server may ensure that the specified pattern is closely approximated using the failover assignment.

In some embodiments, the selection of the new device may be based on a set of rules or priorities. For example, various ones of the videoconferencing devices may be typically associated with other videoconferencing devices, e.g., according to priorities. For example, a first endpoint (or first user associated with the endpoint) may have a priority list of MCUs, recording servers, gateways, etc. More specifically, the first endpoint may use a first MCU when available and only use a second MCU if the first MCU is not available, e.g., in a prioritized manner. Similarly, an endpoint may have an affinity assigned to a first recording server, but may use a different recording server when the first recording server is unavailable. Accordingly, during failover, the priority associated with videoconferencing devices of the videoconference may be used to select the new device. Alternatively, or additionally, the priority may be associated with configurations. For example, a recording configuration may specify a desired recording server and a backup recording server. Accordingly, the backup recording server may be used if the desired recording server is unavailable. According to various embodiments, the priority may be adhered to strictly or may simply be used to inform the selection (e.g., may only influence rather than control the selection).

In some embodiments, the selection of the new device may be performed in an "intelligent" or adaptive fashion. For example, rather than simply analyzing current loads, static rules, priorities, etc., the method may monitor usage patterns and select the new device based on the usage patterns. As a specific example, the method may determine that a certain location or geographic area uses MCUs heavily during a certain time period (e.g., Austin, between 10 AM and 12 PM). Accordingly, the method may ensure that MCUs in that area are available for the expected activity in selecting the new device. For example, if the current time is 9:50 AM and a failover occurs, the method may keep the MCUs in the Austin area at a lower load due to the expected use, e.g., by avoiding selection of MCUs in the Austin area during failover.

Additionally, the selection of the new device may take various costs into account. For example, some of the available videoconferencing devices may have a monetary cost associated with their use, e.g., a per minute cost, a per use cost, a licensing cost, etc. Accordingly, the selection of the new device may attempt to minimize or eliminate costs where possible. Thus, instead of selecting a first videoconferencing device that has such associated costs, the method may select, where possible, a different videoconferencing device that can perform the same or similar functionality without, or at a lower, cost than the first videoconferencing device.

In the descriptions above, the failover is performed for videoconferencing devices involved in a videoconference. However, it should be noted that the method of FIG. 4 may be performed whether or not the failover occurs during a videoconference. For example, the method may be performed for scheduled videoconferences (e.g., changing a scheduled conference to be assigned to a new videoconferencing device (such as an MCU or recording server) in response to failure of the originally assigned videoconferencing device. Additionally, in some embodiments, videoconferences may be available, but not used, for various ones of the endpoints. For example, a user may have an endpoint in his office and a videoconference may be available for that endpoint at any time. For example, another endpoint may be able to connect to the videoconference at any desired time (e.g., unless the user has disabled the availability). In such embodiments, these "ready" or "always ready" videoconferences (sometimes referred to as "virtual meeting rooms", "on-demand videoconferences", or "ad-hoc videoconferences") may not be scheduled or being actually performed, but may need to be transferred during failover so that they may still be performed even when the videoconferencing devices originally associated with the videoconference has failed.

In some embodiments, it may not be possible to recover the videoconference fully. For example, there may not be enough available ports or bandwidth based on current use of MCUs, recording servers may be unavailable, etc. Accordingly, in some embodiments, the method may perform a best effort recovery which may result in a partial recovery of the videoconference. For example, the videoconference may be recovered without recording, may lose one or more videoconferencing endpoints, may lose some other functionality (e.g., presentation services), etc. Alternatively, the method may not perform recovery if full recovery is not possible.

In the method described above, the monitoring and failover performed by the computer systems may be performed via software rather than dedicated hardware failover implementations.

Figure 5:
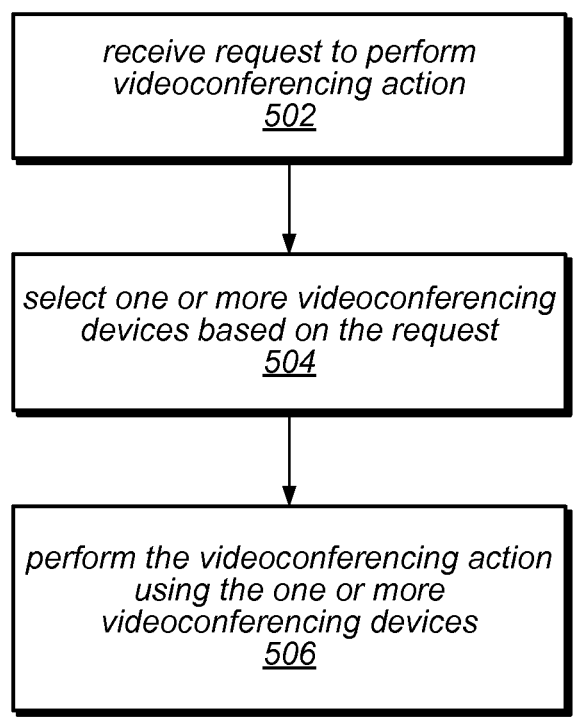
FIG. 5 is a flowchart diagram illustrating an embodiment of a method for performing load balancing for a plurality of different types of videoconferencing devices.

FIG. 5—Providing Load Balancing in Videoconferencing Systems

FIG. 5 illustrates a method for providing high availability in videoconferencing systems. The method shown in FIG. 5 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 502, a request to perform videoconferencing or a videoconferencing related action may be received. For example, the request may be received to initiate a videoconference, schedule a videoconference, establish an on-demand videoconference, begin recording a videoconference, etc. In one embodiment, the request may be received by the monitoring or control server(s) described above.

In 504, in response to the request, one or more videoconferencing devices may be selected to perform the videoconference or videoconferencing action. The selection process may be performed according to load balancing, similar to that described in 406 above. Also similar to above, the selection may be performed by control or monitoring server(s). Additionally, in some embodiments, a plurality of videoconferencing devices of different types, subtypes, and/or manufacturers may be selected.

In 506, the videoconference or videoconferencing action may be performed by the one or more videoconferencing devices. For example, the monitoring or control server(s) may provide signals to the selected videoconferencing devices and, in response, those devices may perform the requested videoconference or videoconferencing action.

FIGS. 6A-6C and 7-9

FIGS. 6A-6C and 7-9 are exemplary Figures corresponding to the methods of FIGS. 4 and 5. These Figures and descriptions are provided as examples only and are not intended to limit the scope of the descriptions above.

Figure 6A:
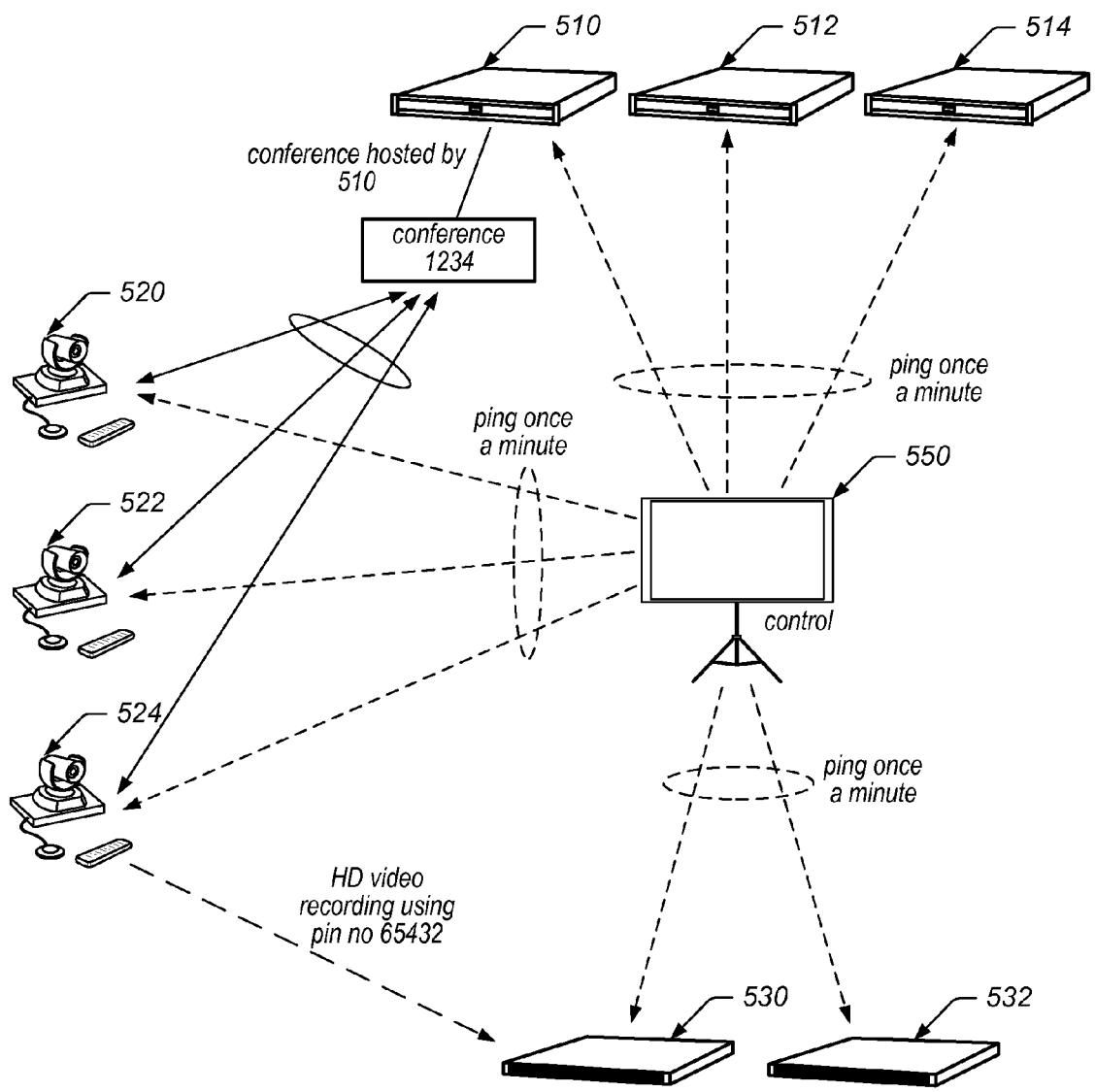
FIGS. 6A-6C and 7-9 illustrate exemplary diagrams corresponding to the methods of FIGS. 4 and 5, according to various embodiments.
Figure 6B:
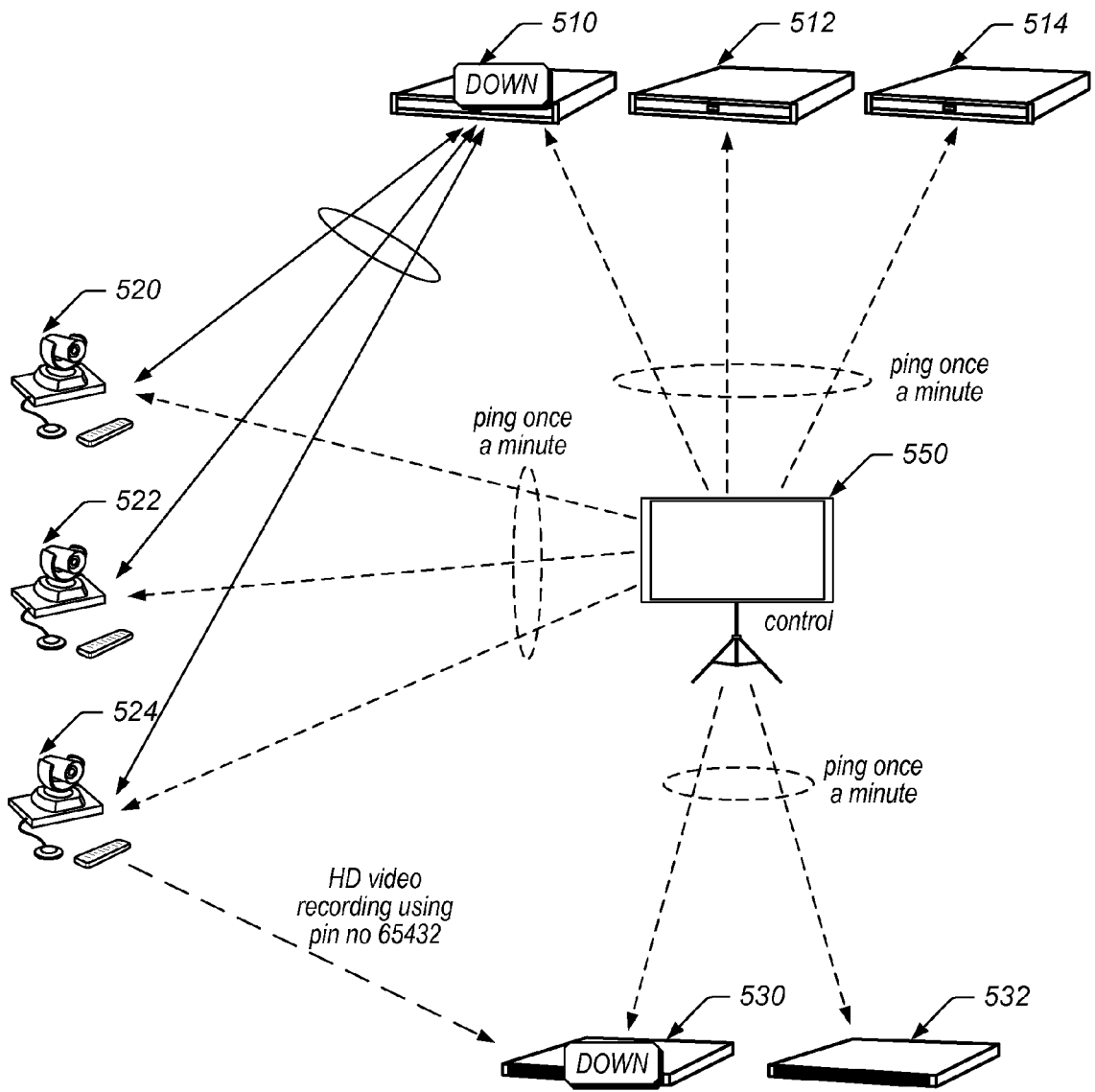
Figure 6C:
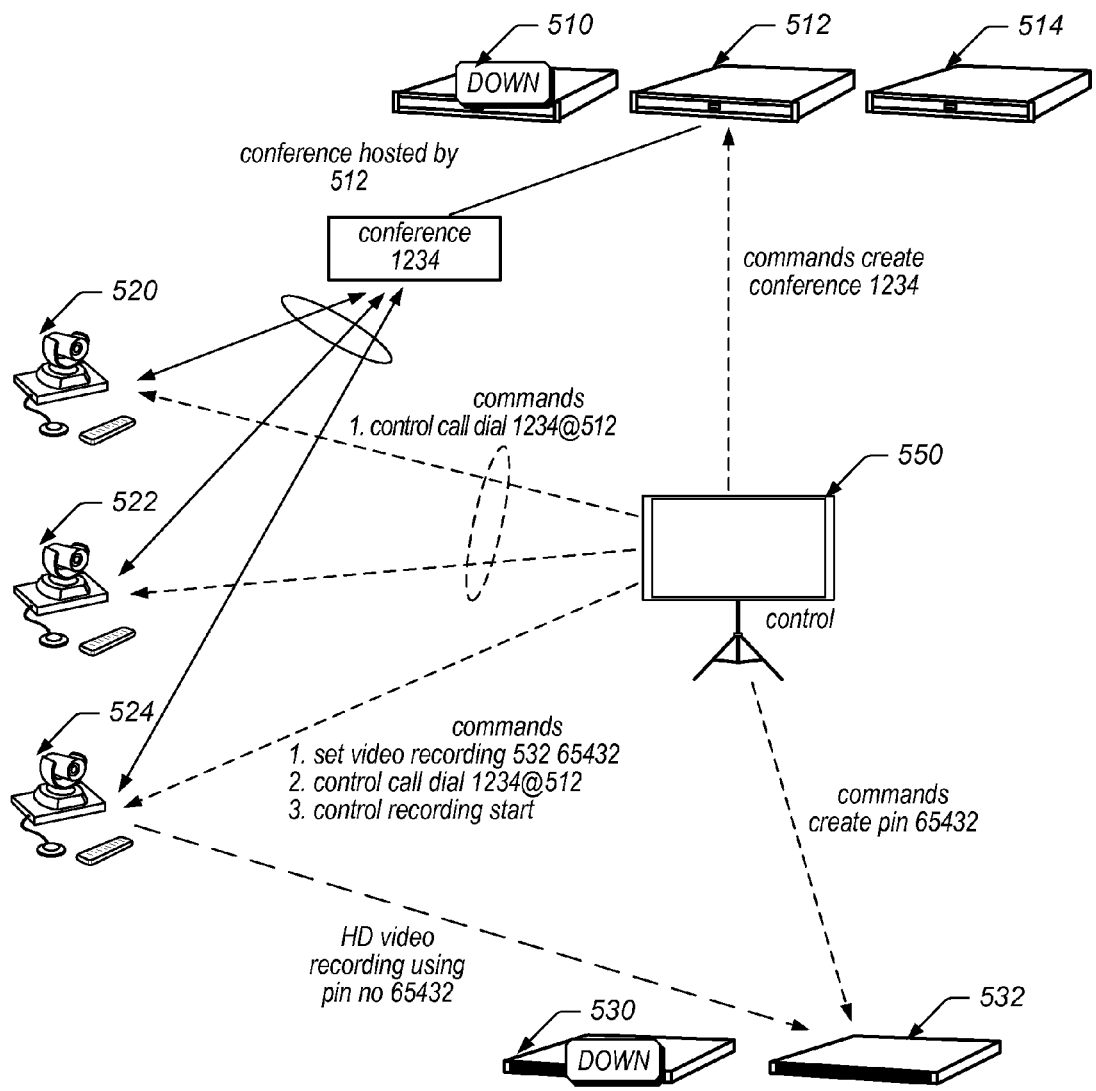

FIGS. 6A-6C are system diagrams illustrating an exemplary set of videoconferencing devices with an ongoing videoconference. More specifically, in FIG. 6A, videoconferencing bridge 510 is hosting conference 1234 between videoconferencing endpoints 520, 522, and 524. Additionally, recording server 530 is recording the videoconference using video conferencing data provided by videoconferencing endpoint 524 using recording configuration 65432. As also shown, control server 550 monitors the videoconferencing devices in the videoconference as well as bridges 512 and 514 and recording server 532 by pinging each device once every minute.

In FIG. 6B, both videoconferencing bridge 510 and recording server 530 have gone down. In response, in FIG. 6C, control server 550 provides a command to create conference 1234 to videoconferencing bridge 512; commands to videoconferencing endpoints 520 and 522 to call videoconferencing bridge 512 (to reestablish the conference); commands to videoconferencing endpoint 524 to set recording to recording server 532 using recording configuration 65432, call videoconferencing bridge 512, and begin recording; and a command to recording server 532 to create and/or use recording configuration 65432. Accordingly, after both videoconferencing bridge 510 and recording server 530 fail, failover is performed for the videoconference 1234 to videoconferencing bridge 512 and recording server 532 in an efficient manner.

Figure 7:
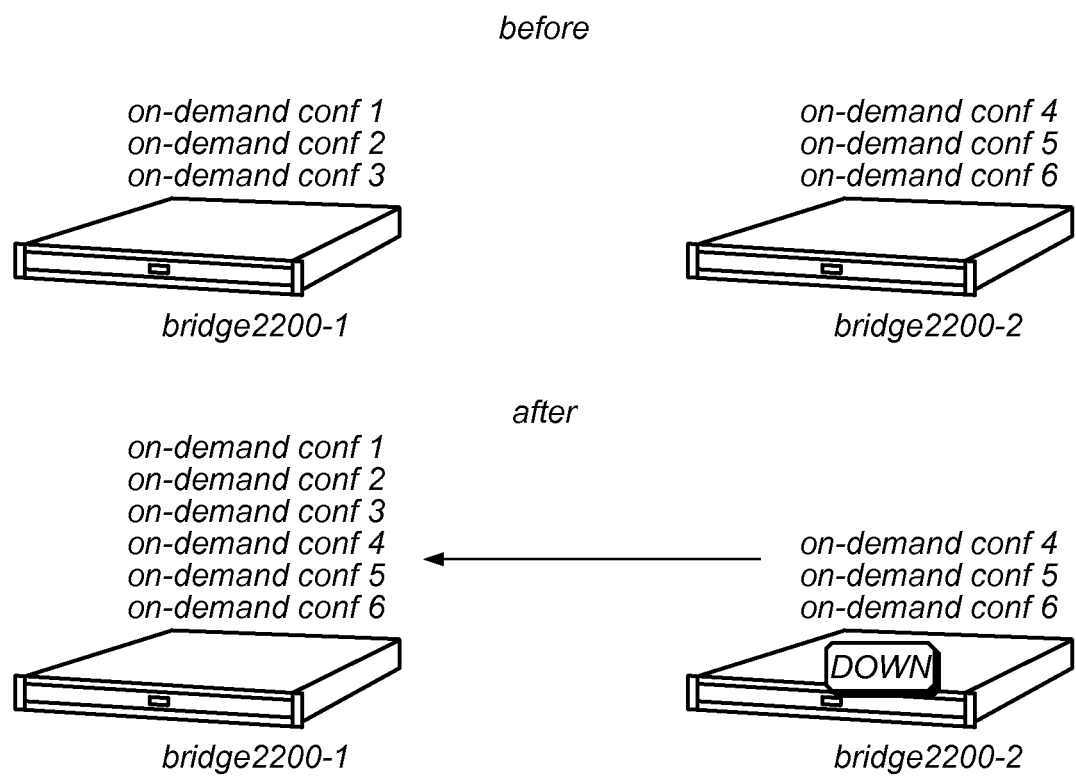

FIG. 7 illustrates a before and after of two bridges (2200-1 and 2200-2) when bridge 2200-2 fails. As shown, on-demand conferences 1-3 are assigned to bridge 2200-1 and on-demand conferences 4-6 are assigned to bridge 2200-2 before failure of bridge 2200-2. After failure, all of the on-demand conferences are assigned to bridge 2200-1.

Figure 8:
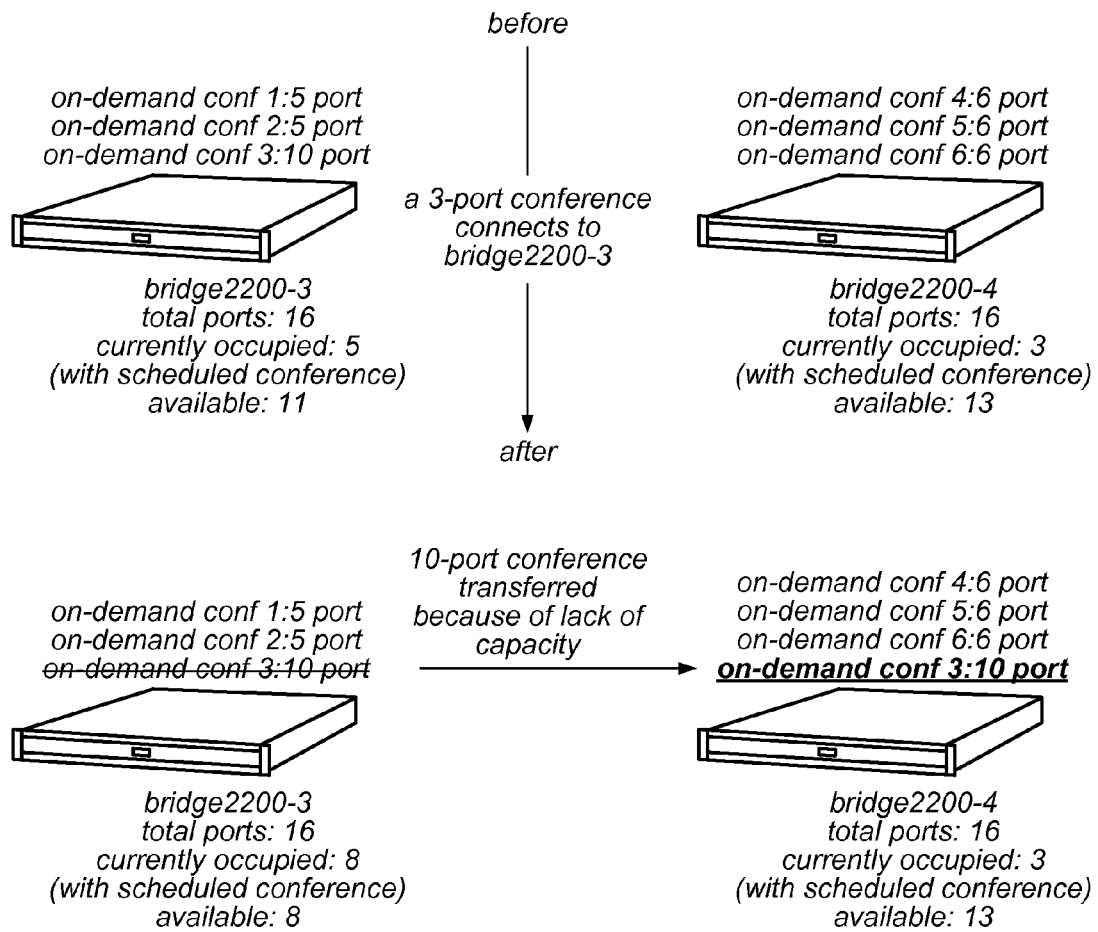

FIG. 8 illustrates a before and after of two bridges (2200-3 and 2200-4) when a 3 port conference connects to bridge 2200-3. As shown, on-demand conferences 1, 2, and 3, having 5 ports, 5 ports, and 10 ports respectively, are currently associated with bridge 2200-3 and on-demand conferences 4, 5, and 6, having 6 ports each, are currently assigned to bridge 2200-4. Bridge 2200-3 has 16 total ports with 5 being used by current or scheduled videoconferences (not shown), leaving 11 ports available. Bridge 2200-4 has 16 total ports with 3 being used by current or scheduled videoconferences (not shown), leaving 13 available ports. After the three port conference joins bridge 2200-3, 8 ports are occupied and only 8 ports are available. Because of this, bridge 2200-3 could no longer handle on-demand conference 3 (e.g., if it were initiated or used) as it does not have 10 ports available any longer. Accordingly, on-demand conference 3 is shifted (e.g., by a load balancing and/or monitoring server) from bridge 2200-3 to bridge 2200-4, which has more than 10 ports available.

Figure 9:
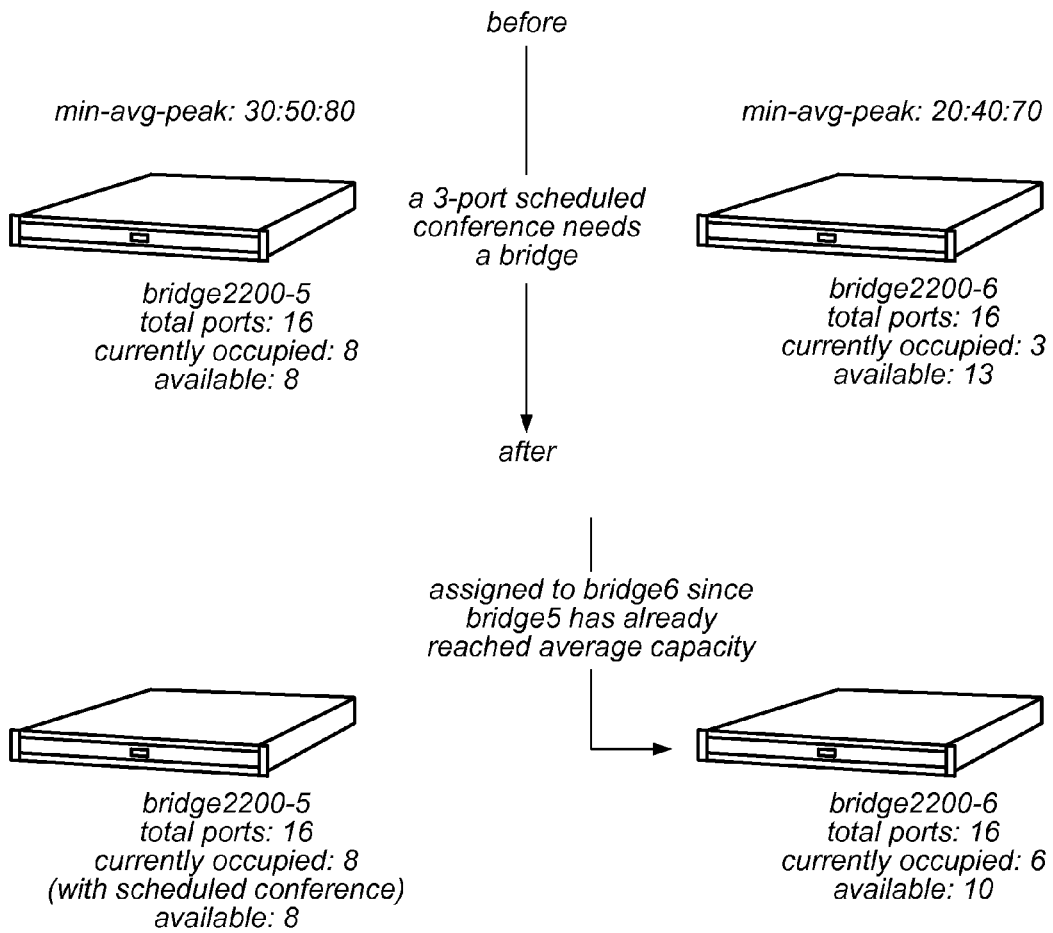

FIG. 9 illustrates a before and after of two bridges when a 3-port conference requests a bridge. As shown, bridge 2200-5 has a min-avg-peak value of 30-50-80 with 8 available ports. Bridge 2200-6 has a min-avg-peak value of 20-40-70 with 13 available ports. Accordingly, the 3-port conference is assigned to bridge 2200-6 since bridge 2200-5 has already reached capacity.

Advantages

An organization, such as a company, may invest in infrastructure elements from different vendors for videoconferencing devices. For example, at one point the organization may have bought MCUs from a first vendor or manufacturer and may now be buying from a different vendor or manufacturer due to changing technologies and better products from other vendors at different point in time. Such organizations may not be willing to pay license fee in order to cluster each of the similar appliances (say all MCUs) since the amounts can be significant. Accordingly, the various videoconferencing devices may not be homogeneous—for example, an organization may have 2 hardware appliance MCUs and 2 software MCU virtual machines. Without using embodiments described above, there is no easy way to achieve a high availability solution among these elements. More specifically, using various embodiments described above, high availability functionality may be implemented for each of the videoconferencing devices in a consistent manner, even for products from multiple vendors.

Embodiments of a subset or all (and portions or all) of the above may be implemented by program instructions stored in a memory medium or carrier medium and executed by a processor.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A non-transitory, computer accessible memory medium storing program instructions for providing high availability in videoconferencing systems, wherein the program instructions are executable by a processor of a first server to:
 monitor a first plurality of videoconferencing devices of a first type, wherein at least one device of the first plurality of videoconferencing devices is performing activities corresponding to a respective videoconference during said monitoring, wherein the first type is multipoint control unit (MCU);
 monitor a second plurality of videoconferencing devices of a second type, wherein the second type is different from MCU, and wherein at least one device of the second plurality of videoconferencing devices is performing activities corresponding to the respective videoconference during said monitoring;
 in response to failure of a first device of the at least one device of the first plurality of videoconferencing devices, perform failover of the first device to a second device of the first plurality of videoconferencing devices, wherein after said performing failover, the second device performs the activities corresponding to the respective videoconference that the first device was performing based on the failure of the first device.

2. The non-transitory, computer accessible memory medium of claim 1, wherein the program instructions are further executable to:
 in response to failure of a third device of the at least one device of the second plurality of videoconferencing devices, perform failover of the third device to a fourth device of the second plurality of videoconferencing devices, wherein after said performing failover, the fourth device performs the activities corresponding to the respective videoconference that the third device was performing based on the failure of the third device.

3. The non-transitory, computer accessible memory medium of claim 1, wherein the first plurality of videoconferencing devices are heterogeneous, wherein the first device is provided by a first vendor and the second device is provided by a second vendor.

4. The non-transitory, computer accessible memory medium of claim 1, wherein the second type is gateway.

5. The non-transitory, computer accessible memory medium of claim 1, wherein the second type is recording server.

6. The non-transitory, computer accessible memory medium of claim 1, wherein said performing failover comprises:
 modifying affinity of at least one other device in the videoconference corresponding to the first device from the first device to the second device.

7. The non-transitory, computer accessible memory medium of claim 1, wherein said monitoring the first plurality of videoconferencing devices comprises periodically receiving signals from the first plurality of videoconferencing devices.

8. The non-transitory, computer accessible memory medium of claim 1, wherein the program instructions are further executable to:
 perform load-balancing among the first plurality of videoconferencing devices and the second plurality of videoconferencing devices in response to new videoconferences.

9. The non-transitory, computer accessible memory medium of claim 1, wherein said performing load-balancing comprises:

receiving a request to perform a videoconference;
in response to the request to perform the videoconference, determining at least one device from the first plurality of videoconferencing devices and the second plurality of videoconferencing devices for performing videoconferencing actions in the videoconference; and
assigning the determined at least one device to the videoconference in response to said determining.

10. A method for providing high availability in videoconferencing systems, comprising:
a first server monitoring a first plurality of videoconferencing devices of a first type, wherein at least one device of the first plurality of videoconferencing devices is performing activities corresponding to a respective videoconference during said monitoring, wherein the first type is multipoint control unit (MCU);
the first server monitoring a second plurality of videoconferencing devices of a second type, wherein the second type is different from MCU, and wherein at least one device of the second plurality of videoconferencing devices is performing activities corresponding to the respective videoconference during said monitoring;
in response to failure of a first device of the at least one device of the first plurality of videoconferencing devices, the first server performing failover of the first device to a second device of the first plurality of videoconferencing devices, wherein after said performing failover, the second device performs the activities corresponding to the respective videoconference that the first device was performing based on the failure of the first device.

11. The method of claim 10, further comprising:
in response to failure of a third device of the at least one device of the second plurality of videoconferencing devices, performing failover of the third device to a fourth device of the second plurality of videoconferencing devices, wherein after said performing failover, the fourth device performs the activities corresponding to the respective videoconference that the third device was performing based on the failure of the third device.

12. The method of claim 10, wherein the first plurality of videoconferencing devices are heterogeneous, wherein the first device is provided by a first vendor and the second device is provided by a second vendor.

13. The method of claim 10, wherein the second type is gateway.

14. The method of claim 10, wherein the second type is recording server.

15. The method of claim 10, wherein said performing failover comprises:
modifying affinity of at least one other device in the videoconference corresponding to the first device from the first device to the second device.

16. The method of claim 10, wherein said monitoring the first plurality of videoconferencing devices comprises periodically receiving signals from the first plurality of videoconferencing devices.

17. The method of claim 10, further comprising:
performing load-balancing among the first plurality of videoconferencing devices and the second plurality of videoconferencing devices in response to new videoconferences.

18. The method of claim 10, wherein said performing load-balancing comprises:
receiving a request to perform a videoconference;
in response to the request to perform the videoconference, determining at least one device from the first plurality of videoconferencing devices and the second plurality of videoconferencing devices for performing videoconferencing actions in the videoconference; and
assigning the determined at least one device to the videoconference in response to said determining.

* * * * *